United States Patent [19]
Anson

[11] Patent Number: 4,927,435
[45] Date of Patent: May 22, 1990

[54] ROTATING DRUM FILTER

[75] Inventor: Donald Anson, Worthington, Ohio

[73] Assignee: Battelle Memorial Institute, Columbus, Ohio

[21] Appl. No.: 332,647

[22] Filed: Mar. 31, 1989

[51] Int. Cl.$^5$ .............................................. B01D 46/04
[52] U.S. Cl. ......................................... 55/96; 55/97; 55/282; 55/290; 55/301; 55/474; 55/524; 55/528
[58] Field of Search ................ 55/1, 96, 97, 282, 290, 55/293, 301, 338, 400, 404, 466, 474, 479, 524, 528

[56] References Cited
U.S. PATENT DOCUMENTS

| | | | |
|---|---|---|---|
| 3,151,187 | 9/1964 | Comte | 55/274 X |
| 4,295,868 | 10/1981 | Holter et al. | 55/274 X |
| 4,415,342 | 11/1983 | Foss | 55/96 |
| 4,427,422 | 1/1984 | Hiederer | 55/96 |
| 4,481,019 | 11/1984 | Moreno | 55/96 |

Primary Examiner—Charles Hart
Attorney, Agent, or Firm—Philip M. Dunson

[57] ABSTRACT

A perforated drum (10) rotates in a coaxial cylindrical housing (18) having three circumferential ports (19,22,23), and an axial outlet (24) at one end. The axis (11) is horizontal. A fibrous filter medium (20) is fed through a port (19) on or near the top of the housing (81) by a distributing mechanism (36) which lays a uniform mat (26) of the desired thickness onto the rotating drum (10). This mat (26) is carried by the drum (10) to a second port (23) through which dirty fluid (13) enters. The fluid (13) passes through the filter (26) and the cleaned stream (16) exits through the open end (15) of the drum (10) and the axial port (24) in the housing (18). The dirty filter material (20) is carried on to a third port (22) near the bottom of the housing (18) and drops into a receiver (31) from which it is continuously removed, cleaned (30), and returned (32) to the charging port (36) at the top. To support the filter mat, the perforated cylinder may carry a series of tines (40), shaped blades (41), or pockets, so that the mat (26) will not fall from the drum (10) prematurely. To minimize risk of mat failure, the fluid inlet port (23) may be located above the horizontal centerline (11).

9 Claims, 2 Drawing Sheets

ROTATING DRUM FILTER

FIELD

This invention relates to methods and apparatus for removing pollutants such as dust from fluid streams. It is especially useful and efficient in the removal of particles having diameters in the range of about 50 micrometers or less from fluid streams, and entails relatively low pressure drop.

In typical methods and apparatus according to the present invention for removing a pollutant such as dust from a fluid stream, a perforated drum rotates in a coaxial cylindrical housing having three circumferential ports, and an axial outlet at one end. The axis is generally horizontal. A fibrous filter medium is fed through a port preferably on the upper part of the housing by a distributing mechanism which lays a uniform mat of the desired thickness onto the rotating drum. This mat is carried by the drum to a second port through which dirty fluid enters. The fluid passes through the filter and the cleaned stream exits through the open end of the drum and the axial port in the housing. The dirty filter material is carried on to a third port in the lower part of the housing and drops into a receiver from which it is removed, cleaned, and returned to the charging port at the top. Drum rotation may be continuous or intermittent.

To support the filter mat, the perforated cylinder may carry a series of tines shaped blades, or pockets, so that the mat will not fall from the drum prematurely. To minimize risk of mat failure, the fluid inlet port may be located above the horizontal centerline.

BACKGROUND

The removal of particulate matter from air streams is typically done now with baghouses or electrostatic precipitators and from liquids with screens or filters. Baghouses usually employ fabrics which serve as the support for the buildup of a filter cake. Periodically, the filter cake is shaken or blown loose from the fabric and collected, and the cycle is repeated.

Typical pressure drops are on the order of 10–20 cm WC (water column). As might be expected, there is some loss of efficiency after the cake is removed during the cleaning cycle and there tends to be a relatively high pressure drop during the latter phase of filtration just prior to cleaning. Furthermore, baghouse fabrics may blind due to lodging of fine particles or sticky materials in the pores of the fabric.

In addition to commercial baghouses and electrostatic precipitators, research and development work has been done on recirculating, granular-bed filters. These filters comprise a bed of granules in which the granules are recycled out the bottom of the bed, cleaned, and returned to the top. Dirty gas flows from side to side or from bottom to top, counter-current to the granule movement.

The removal of solid particles from the gas stream is vital to the successful operation of gas turbines in which coal or other ash forming fuel is burnt. An example is found in pressurized fluidized bed combustion (PFBC) of coal, in which the combustion products, at pressures typically of 5 to 20 atmospheres, exhaust through a gas turbine.

The advantages of Pressurized Fluidized-Bed Combustion (PFBC) in a combined cycle mode to produce electricity include potential overall efficiencies greater than 40 percent, and control of $SO_x$, and $NO_x$ emmissions well below EPA's New Source Performance Standards (NSPS).

As part of their PFBC program, a major developmental thrust of the U.S. Department of Energy (DOE), has been high temperature, high pressure (HTHP) particulate removal to meet turbine requirements and Environmental Protection Agency (EPA) standards of particulate emissions. Customarily, at least two separate stages of filtration are used: (1) a cyclone prefilter to scavenge large particulates (at least 20 micrometers in diameter); and (2) a primary filter to remove fine dust. The filtration requirements are set by protection of the gas turbine from erosive damage and by EPA/NSPS emission constraints.

Fabric filters arrayed in a baghouse comprise one of the technologies of choice in contemporary developments. The baghouse can be an expensive component (around 25 percent of the capital cost of an FBC installation) and also can pose some significant operational expenses in maintenance. While much progress has been made, the goal of achieving high collection efficiency at high temperature and pressure is yet to be reached with such filters.

The present novel concept of a rotating drum filter provides very high efficiency at relatively low pressure drop. The concept is based upon filtration through fibrous media that support the buildup of chain-like dust agglomerates (dendrites) which has been shown to be one of the most effective means for collection of micrometer and submicrometer particulates from gas streams. Fibrous media filters differ from fabric filters (baghouses) because the dust is deposited mainly on sites within the interior of the fiber bed, while in a fabric filter the dust forms an external cake on the surface. Fibrous media filtration provides the advantage of high efficiency at high gas flow rates. On a comparable efficiency basis, pressure drop for a fibrous filter is lower than for a baghouse.

The chief reason for the lack of wide acceptance of fibrous media filtration in the industrial market is related to the need for frequent cleaning or regeneration of the fiber bed. Consequently, fibrous filters have been employed only for nonregenerable applications such as residential furnace filters, respirator masks, and emergency filters for radioactive particle leaks. The present invention provides convenient continuous regeneration, and maximizes the advantages of dendrite filtration.

It has been found that the dendritic capture may be increased and the pressure drop decreased by increasing voidage. This leads to lower operating costs. One of the advantages of a fiber filter over a granular filter is the ability to develop and control this high voidage. The term voidage is intended to mean the percentage of a particular space that is empty of solids. It is calculated by determining the volume of the filter occupied by fibers, $V_f$, as by dividing the mass of fibers by the density of the fiber material. The volume of empty space is then the total filter volume less the volume of fibers, $V_T - V_f$, and the voidage is the empty volume expressed as a fraction of the total volume, $$\text{voidage} = \frac{V_T - V_f}{V_T}.$$

The high voidage is or loose packing phenomenon. It has been found that high-aspect-ratio fibers tend to nest in a rather rigid, high voidage array when they are loosely poured into a container. The nesting is a matter of degree. For capturing fine particles in the 1-20 micrometer range, fibers in the range of about 0.075 to 2 mm diameter and aspect ratios of above about 20 are preferred in the present invention. The voidage appears to vary linearly with aspect ratio of the fibers.

The nesting of fibers also provides a second advantage over the packing of granules in the granular-bed filters. The fiber nests tend to be quite rigid compared with the loose granules. Thus, dendritic formations contributing to good capture are retained in the cohesive fiber bed düring operation. On the contrary, dust captured between bed granules can be lost by the downward movement of the loose granules in a granular bed filter.

The fibers may be made of any useful material including both organic and inorganic materials. They may capture particulate material by purely physical means or they may react chemically with a particulate material or gas. The fibers may also be catalytic or be coated with inert, reactant, or catalytic material. For example, metal fibers may have a catalytic coating to convert $SO_2$ in flue gas to $SO_3$, or a lime coating that can react with the $SO_2$ to produce a $CaSO_4$ deposit on the fiber.

Refractory fibers, as well as metal fibers, can be used for high temperature applications. For example, catalytic cracking of high boiling hydrocarbons to gasoline fractions can take place at about 500 C with fibers made or coated with modified, hydrated alumina silicates. Deposited carbon can be removed by burning in air in the regenerator.

An advantage of the present invention is the high face velocity that is possible for effective filtration at low pressure drop. Face velocities of 200 fpm are possible compared to velocities of 2-4 fpm for bag filters.

The present invention provides reliable operation at high temperatures, such as 2000° F. and above, and at high pressures, such as 350 psig and above, as well as at lower temperatures and pressures. Other advantages include operation with lower pressure drops than are usually obtained with known apparatus, higher reliability, and the ability to operate continuously without interruption for cleaning.

High temperature, high pressure (HTHP) gases from operations such as pressurized fluid-bed combustion (PFBC), integrated gasification combined cycle (IGCC), and direct coal-fired turbines require very efficient particle control. The present invention provides such control.

DISCLOSURE

A typical method according to the present invention for removing a pollutant such as dust from a fluid stream comprises providing a substantially cylindrical rotatable drum, positioned with its axis substantially horizontal, having openings for entering fluid in its cylindrical surface, and at least one opening for exiting fluid in an end surface.

Providing a substantially cylindrical housing around the drum and coaxial therewith, having a supply opening for filter material in the upper part of its cylindrical surface, a removal opening for filter material in the lower part thereof, an inlet opening for fluid at least partly higher than the axis and generally between the filter material supply and removal openings, and at least one outlet opening for fluid in an end surface, providing a continuous and substantially uniform array of loosely nested fibers through the filter material supply opening of the housing onto the cylindrical surface of the drum to form a filtering mat over a region thereof at least wide enough to meet all of the fluid that may pass through the fluid inlet in the housing, and completely filling the annular space between drum and housing rotating the drum intermittently or continuously about its axis to carry the nested fibers downward past the fluid inlet and thence to and out through the filter material removal opening of the housing, and directing a stream of fluid into the fluid inlet of the housing, in through the adjacent mat of nested fibers and openings in the cylindrical surface of the drum, out through at least one opening in an end surface of the drum and through at least one outlet opening for fluid in an end surface of the housing, and away therefrom to means for utilizing the filtered fluid.

Typically the fibers removed from the housing are cleaned and then used again to continue to provide the array of loosely nested fibers.

Typical apparatus according to this invention for removing a pollutant such as dust from a fluid stream comprises a combination of means for carrying out the above steps.

Typically, in such apparatus, the entire inlet opening for fluid in the housing is located higher than the axis of the housing and the drum.

The apparatus may comprise also means projecting outwardly from the cylindrical surface of the drum to support the nested fibers and hold them substantially in place as they move downward past the fluid inlet of the housing. Such outwardly projecting means typically comprise substantially radial thin substantially cylindrical members such as tines or prongs, thin and narrow substantially flat members such as blades or the like, and at least some of the substantially radial members may be bent at their outer ends generally in the direction opposite to the direction in which the drum rotates.

The cylindrical surface of the drum may comprise convolutions to provide a greater area for filtering than that of a plain circular cylindrical surface.

DRAWINGS

CARRYING OUT THE INVENTION

Figure 1:
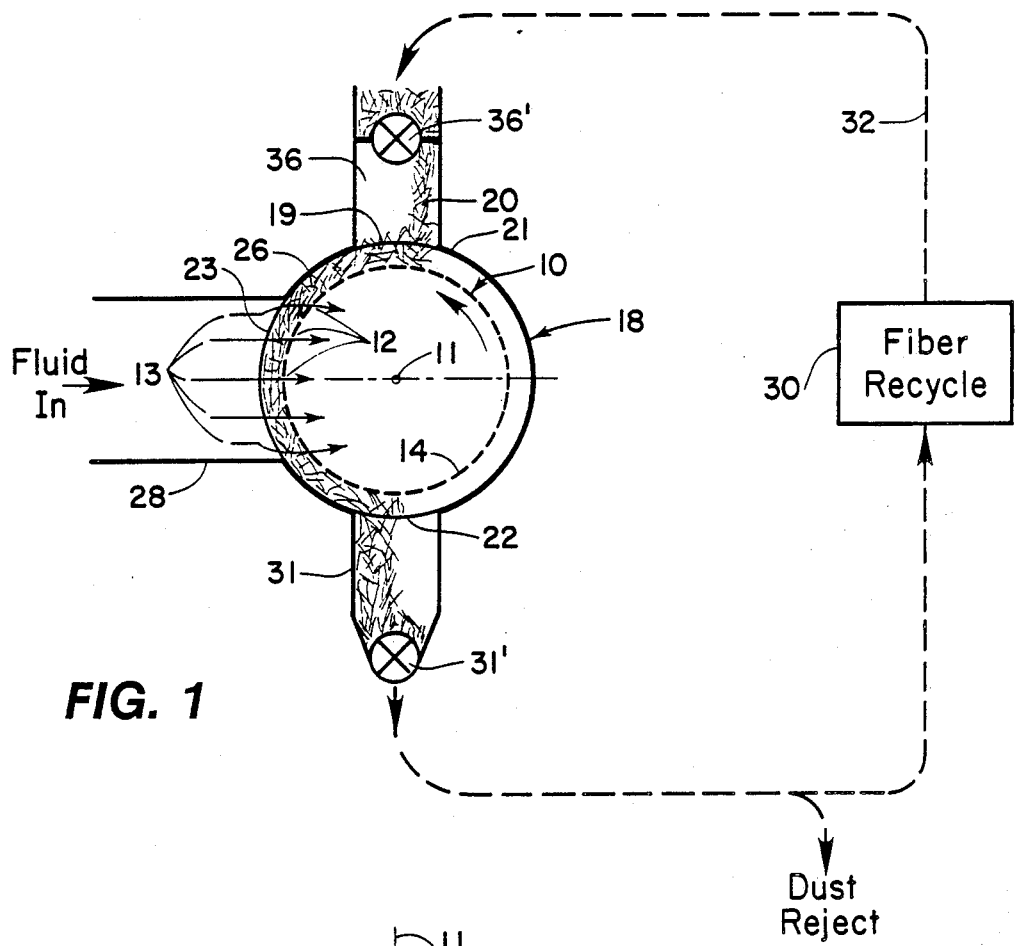
FIG. 1 is a schematic front sectional view of typical apparatus according to the present invention.
Figure 2:
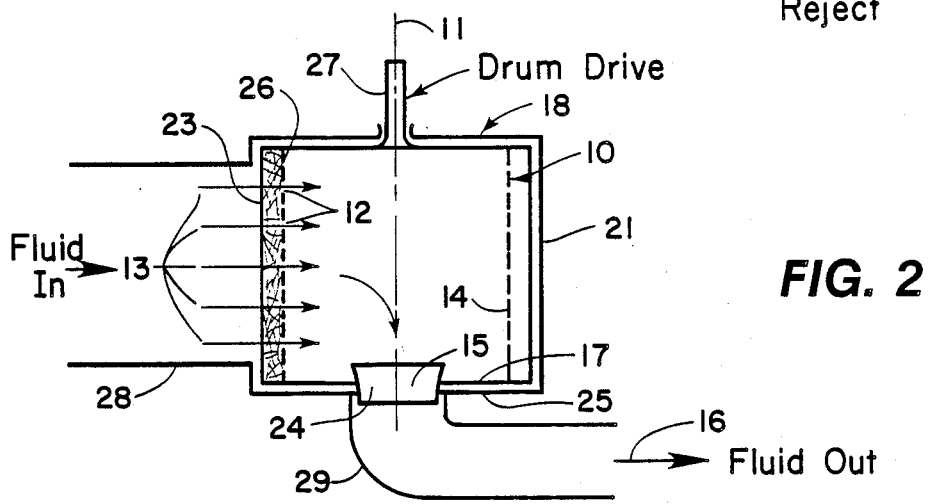
FIG. 2 is a schematic top sectional view of typical apparatus as in FIG. 1.

Referring now to FIGS. 1 and 2, typical apparatus according to the present invention for removing a pollutant such as dust from a fluid stream, comprises a substantially cylindrical rotatable drum 10, positioned with its axis 11 substantially horizontal, having openings 12 for entering fluid 13 in its cylindrical surface 14, and at least one opening 15 for exiting fluid 16 in an end surface 17, a substantially cylindrical housing 18 around the drum 10 and coaxial therewith, having a supply opening 19 for filter material 20 in the upper part of its cylindrical surface 21, a removal opening 22 for filter material 20 in the lower part thereof, an inlet opening 23 for fluid 13 at least partly higher than the axis 11 and generally between the filter material supply 19 and removal 22 openings, and at least one outlet opening 24 for fluid 16 in an end surface 25, means, such as a conduit 36, for providing a continuous and substantially uniform array 26 of loosely nested fibers 20 through the filter material supply opening 19 of the housing 18 onto the cylindrical surface 14 of the drum 10 to form a filtering mat 26 over a region thereof at least wide enough to meet all of the fluid 13 that may pass through the fluid inlet 23 in the housing 18, means, such as a drive shaft 27 driven by a motor or other conventional means (not shown), for rotating the drum 10 about its axis 11 to carry the nested fibers 20 (26) downward past the fluid inlet 23 and thence to and out through the filter material removal opening 22 of the housing 18, and means, such as a conduit 28, for directing a stream of fluid 13 into the fluid inlet 23 of the housing 18, in through the adjacent mat 26 of nested fibers 20 and openings 12 in the cylindrical surface 14 of the drum 10, out through at least one opening 15 in an end surface 17 of the drum 10 and through at least one outlet opening 24 for fluid 16 in an end surface 25 of the housing 18, and away therefrom, as via a conduit 29, to means (not shown) for utilizing the filtered fluid 16.

The apparatus typically comprises also means 30 for cleaning the fibers 20 that are removed from the housing 18, as via a conduit 31 and a valve 31′, and means 32 for providing them again, as via the conduit 36 and a valve 36′, into the array 26 of loosely nested fibers 20. The entire inlet opening 23 for fluid 13 in the housing 18 may be located higher than the axis 11 of the housing 18 and the drum 10.

Figure 3:
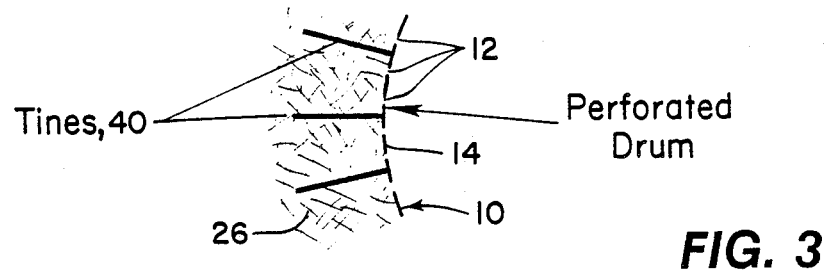
FIG. 3 is a schematic cross sectional view of a small portion of a rotatable drum as in FIGS. 1 and 2, with one form of fiber-supporting means projecting outwardly therefrom.
Figure 4:
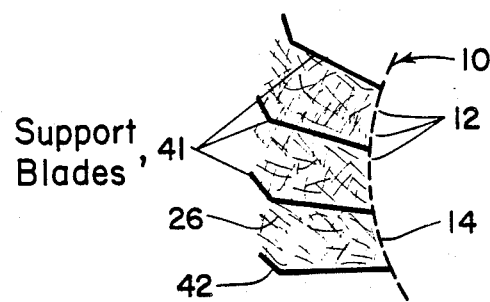
FIG. 4 is a view similar to FIG. 3, with another form of fiber-supporting means.

Referring now to FIGS. 3 and 4, typical apparatus according to the present invention may comprise also means 40,41 projecting outwardly from the cylindrical surface 14 of the drum 10 to support the nested fibers 20 (26) and hold them substantially in place as they move downward past the fluid inlet 23 of the housing 18. Such outwardly projecting means typically comprise substantially radial thin substantially cylindrical members such as tines or prongs 40 (FIG. 3), thin and narrow substantially flat members such as blades 41 (FIG. 4), or the like. As shown in FIG. 4, at least some of the substantially radial members 40,41 may be bent at their outer ends 42 generally in the direction opposite to the direction in which the drum 10 rotates.

Figure 5:
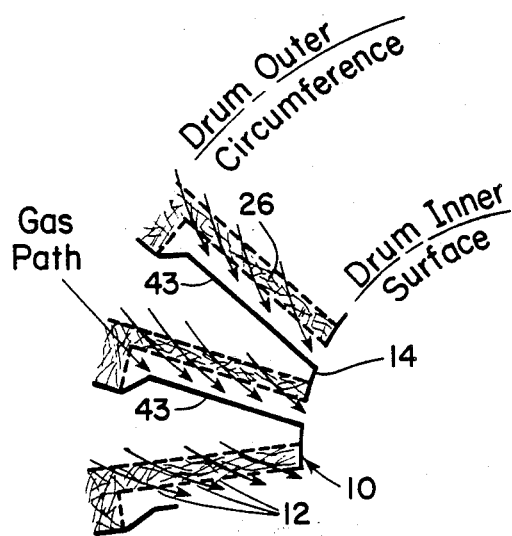
FIG. 5 is a view similar to FIGS. 3 and 4, wherein the rotatable drum has convolutions to provide a larger area for filtering.

As shown in FIG. 5, the cylindrical surface 14 of the drum 10 may comprise convolutions 43 to provide a greater area for filtering than that of a plain circular cylindrical surface.

This invention has several significant advantages. For example, it comprises a compact arrangement that minimizes equipment volume and capital cost; it provides continuous filtration without isolating modules for regeneration; hot valves are not needed to isolate filter modules; and fiber regeneration is provided separately from the filter function without concern of re-entraining particulate matter. The only critical seals are circular elements on the clean gas side at the drive shaft and gas outlet. Seal diameters are substantially less than the drum diameter. Gas leaking circumferentially in the annular space between the drum and casing, or axially at the ends of the inlet conduit, must pass through the filter medium. There is no space for filter bypassing.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit or scope of the invention.

What is claimed is:

1. A method for removing a pollutant such as dust from a fluid stream comprising providing a substantially cylindrical rotatable drum, positioned with its axis substantially horizontal, having openings for entering fluid in its cylindrical surface, and at least one opening for exiting fluid in an end surface, providing a substantially cylindrical housing around the drum and coaxial therewith, having a supply opening for filter material in the upper part of its cylindrical surface, a removal opening for filter material in the lower part thereof, an inlet opening for fluid at least partly higher than the axis and generally between the filter material supply and removal openings, and at least one outlet opening for fluid in an end surface, providing a continuous and substantially uniform array of loosely nested fibers through the filter material supply opening of the housing onto the cylindrical surface of the drum to form a filtering mat over a region thereof at least wide enough to meet all of the fluid that may pass through the fluid inlet in the housing, rotating the drum about its axis to carry the nested fibers downward past the fluid inlet and thence to and out through the filter material removal opening of the housing, and directing a stream of fluid into the fluid inlet of the housing, in through the adjacent mat of nested fibers and openings in the cylindrical surface of the drum, out through at least one opening in an end surface of the drum and through at least one outlet opening for fluid in an end surface of the housing, and away therefrom to means for utilizing the filtered fluid.

2. A method as in claim 1, wherein the fibers removed from the housing are cleaned and then used again to continue to provide the array of loosely nested fibers.

3. Apparatus for removing a pollutant such as dust from a fluid stream comprising a substantially cylindrical rotatable drum, positioned with its axis substantially horizontal, having openings for entering fluid in its cylindrical surface, and at least one opening for exiting fluid in an end surface, a substantially cylindrical housing around the drum and coaxial therewith, having a supply opening for filter material in the upper part of its cylindrical surface, a removal opening for filter material in the lower part thereof, an inlet opening for fluid at least partly higher than the axis and generally between the filter material supply and removal openings, and at least one outlet opening for fluid in an end surface, means for providing a continuous and substantially uniform array of loosely nested fibers through the filter material supply opening of the housing onto the cylindrical surface of the drum to form a filtering mat over a region thereof at least wide enough to meet all of the fluid that may pass through the fluid inlet in the housing, means for rotating the drum about its axis to carry the nested fibers downward past the fluid inlet and thence to and out through the filter material removal opening of the housing, and means for directing a stream of fluid into the fluid inlet of the housing, in through the adjacent mat of nested fibers and openings in the cylindrical surface of the drum, out through at least one opening in an end surface of the drum and through at least one outlet opening for fluid in an end surface of the housing, and away therefrom to means for utilizing the filtered fluid.

4. Apparatus as in claim 3, comprising also means for cleaning the fibers that are removed from the housing, and means for providing them again into the array of loosely nested fibers.

5. Apparatus as in claim 3, wherein the entire inlet opening for fluid in the housing is located higher than the axis of the housing and the drum.

6. Apparatus as in claim 3, comprising also means projecting outwardly from the cylindrical surface of the drum to support the nested fibers and hold them substantially in place as they move downward past the fluid inlet of the housing.

7. Apparatus as in claim 6, wherein the outwardly projecting means comprise substantially radial thin substantially cylindrical members such as tines or prongs, thin and narrow substantially flat members such as blades, or the like.

8. Apparatus as in claim 7, wherein at least some of the substantially radial members are bent at their outer ends generally in the direction opposite to the direction in which the drum rotates.

9. Apparatus as in claim 3 wherein the cylindrical surface of the drum comprises convolutions to provide a greater area for filtering than that of a plain circular cylindrical surface.

* * * * *